A. H. REID.
ATTACHMENT FOR SEATS.
APPLICATION FILED NOV. 17, 1915.

1,220,555.

Patented Mar. 27, 1917.

Inventor:
A. H. Reid
by Rogers, Kennedy & Campbell Attys.

UNITED STATES PATENT OFFICE.

ALBAN H. REID, OF PHILADELPHIA, PENNSYLVANIA.

ATTACHMENT FOR SEATS.

1,220,555. Specification of Letters Patent. Patented Mar. 27, 1917.

Application filed November 17, 1915. Serial No. 61,873.

*To all whom it may concern:*

Be it known that I, ALBAN H. REID, a citizen of the United States, residing at Philadelphia, in the county of Philadelphia and State of Pennsylvania, have invented certain new and useful Improvements in Attachments for Seats, of which the following is a specification, reference being had therein to the accompanying drawing.

This invention relates to an attachment for seats, more particularly for cushioned seats such as are employed in motor and other vehicles. In riding in motor vehicles, there is a great deal of friction between the back of the occupant and the back of the seat, due to the up and down movements of the occupant on the cushioned seat, and in relation to the seat back. This becomes more pronounced in the passage of the vehicle over rough places, and is decidedly objectionable because of the injurious wear on the occupant's garment, and because of the discomfort to the occupant.

My invention aims to overcome these objections, and it consists of an attachment for the seat, which attachment comprises a flat body or pad having a seat portion adapted to rest on the cushioned seat beneath the occupant, and a back portion adapted to extend along the back of the seat between the same and the back of the occupant, whereby in the cushioning action of the seat, the attachment will move up and down in unison therewith and in relation to the back of the seat, thereby preventing frictional wear on occupant's garment.

The invention consists also in the details of construction and combination of parts hereinafter described and claimed.

Figure 1:
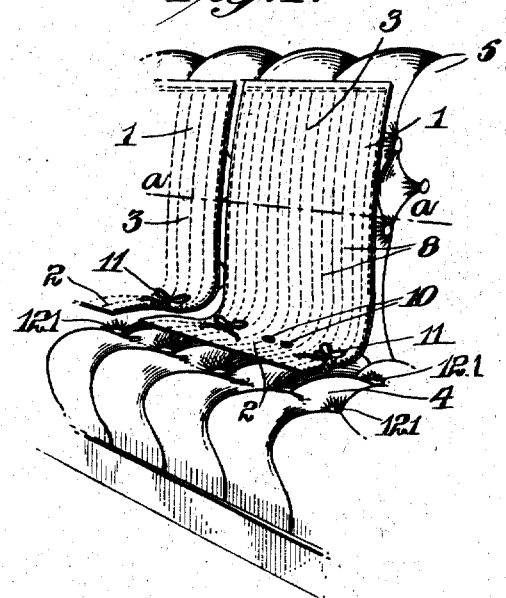
Figure 1 is a perspective view of my improved device.
Figure 3:
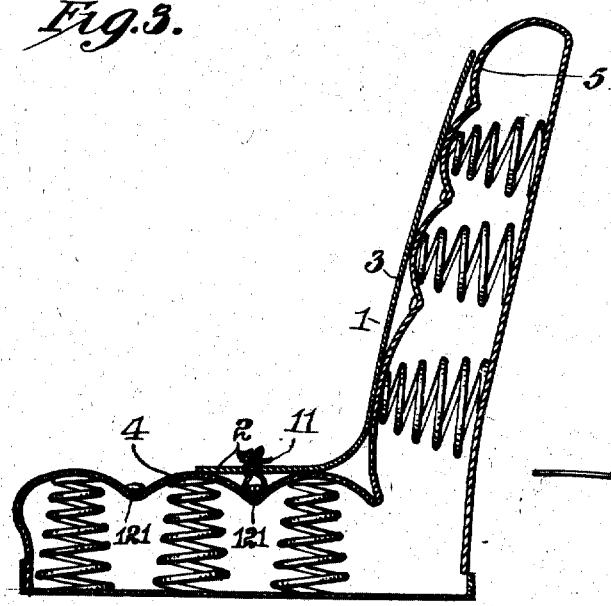
Fig. 3 is a sectional view through a cushioned seat and its back, with my attachment applied thereto, as it appears in use.

Referring to the drawings:

As shown in Fig. 1, my improved device consists of a body or pad 1 which is of flat form transversely, and which comprises a seat portion 2 and a connected back portion 3. The seat portion is adapted to rest on the cushioned seat 4 of an automobile or other vehicle, beneath the occupant thereof, while the back portion of the attachment extends upwardly along the back 5 of the seat and between the same and the back of the occupant, the body 1 being of a form longitudinally to conform generally to the contour of the surface of the cushioned seat and back. When the seat is occupied, with the attachment in place, as shown in Fig. 3, the up and down movements of the occupant in the cushioning action of the seat, will cause the attachment to move up and down as a whole in unison, the back portion 3 in such movements sliding up and down against the back of the seat and moving in relation thereto. As a result there will be no movement of the back of the occupant relatively to the back portion of the attachment, and therefore there will be no frictional wear on the occupant's garment, the only relative motion of the parts being between the back of the seat and back portion of the attachment.

Figure 2:
Fig. 2 is a transverse section through the same on the line *a—a* of the preceding figure.

The attachment embodying the above described features and characteristics may be variously formed and constructed, but I prefer to employ the construction shown more particularly in Figs. 1 and 2, where it will be seen that the body or pad 1 consists of a number of longitudinal stiffening members in the form of flat spring steel strips 6, extending longitudinally throughout the seat and back portions side by side. These strips are spaced apart and held in place by means of two flexible covering sheets 7 of suitable fabric such as muslin, which sheets are applied to the opposite sides of the strips, and are stitched or otherwise fastened together between the strips as at 8. Applied to the opposite sides of the sheets 7 are additional covering sheets 9 of flexible material, preferably antifriction cloth, which are fastened to the sheets 7 by stitching or otherwise securing the same thereto at the intervals between the strips.

The parts arranged and connected in the manner described, constitute a pad or body, flat transversely and capable of yielding and bending so as to conform generally to the cushioned seat and back, and to the body of the occupant. The longitudinal stiffening members, by extending throughout the seat and back portions of the pad, cause the same to move bodily and in unison with the cushioning movements of the seat without relative motion of said portions with each other, while by reason of the flexible connection of the stiffening members by the covering sheets, the attachment may be rolled or folded up into compact form for transportation or shipment.

It is preferable to form the longitudinal stiffening strips or members with a permanent bend at the point where the back portion joins the seat portion, in order to adapt it for application to the seat.

The attachment may be held in place when in use by merely the weight of the occupant sitting on the seat portion thereof, but I prefer to provide means for securing the attachment in place so that it may be readily applied to or removed from the seat when desired. One form of such means is shown more particularly in Figs. 1 and 3, where it will be seen that a number of eyes 10 are applied to the seat portion 2 to receive lacing cords 11, which in securing the attachment in place are fastened to the quilting buttons 121, with which cushioned seats are usually equipped. It will be understood, however, that the attachment may be fastened permanently to the seat instead of by the means just mentioned.

Figure 4:
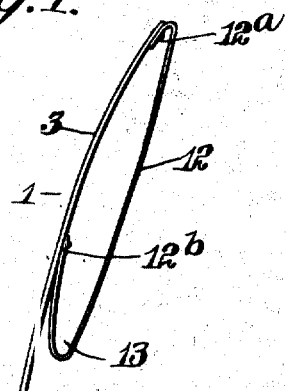
Fig. 4 is a side elevation of the device, having means to prevent interference with the free movements of the same in action.

It may sometimes happen that the surface of the seat back 5 will become sticky, or that by reason of the character of the upholstering material the back portion 3 of the attachment will adhere to the surface of the seat back, and the free up and down movements of the attachment will be interfered with. To avoid such liability I propose, as shown in Fig. 4, to apply to the rear side of the back portion 3 of the attachment, a flexible guard or shield member 12 adapted to extend next to and in contact with the surface of the seat back 5, and being of such form and construction that although the shield may adhere to the sticky seat back, yet the seat attachment will be permitted by reason of the flexible character of the shield, to move up and down freely relatively to the seat back. In its preferred form this shield consists of a sheet of cloth or muslin of the width of the back portion of the attachment, the upper and lower edges of the sheet being attached to the rear side of the back portion as at 12ª and 12ᵇ respectively, and the length of the sheet being such in relation to the distance between the attached edges, that it will hang loosely or bag as at 13. In the operation of the device, the slack or loose portion of the shield will permit the attachment to move up and down freely relatively to the seat back, although this loose portion may adhere to the surface of the seat back and will be incapable of relative motion thereto.

In the foregoing description and in the accompanying drawings, I have set forth my invention in the detailed form and construction which I prefer to adopt, and which in practice has been found to answer to a satisfactory degree the ends to be attained. It will be understood, however, that these details may be variously modified and changed by the skilled mechanic without departing from the limits of my invention, provided that the operation will be substantially as above described, the important feature of the invention being the provision of a body or pad which extends between the back of the seat and back of the occupant, and which in the up and down movements of the occupant in the cushioning actions of the seat, will move in unison with the occupant.

Having thus described my invention, what I claim is:

1. An attachment for seats, said attachment comprising a seat portion and a connected back portion, the seat portion being adapted to rest on the seat beneath the occupant, and the back portion being adapted to extend between the back of the seat and back of the occupant; whereby in the up and down movements of the seat, the back portion of the attachment will move up and down in unison with the occupant and relatively to the back of the seat, thereby preventing wear on the occupant's garment.

2. An attachment for seats, said attachment being adapted to be applied to the seat, and having a portion extending along the back thereof and movable with the seat relatively to the seat back.

3. An attachment for seats, consisting of a flat body comprising a seat portion to rest on the seat, and a connected back portion to extend between the back of the occupant and back of the seat, said body having a plurality of stiffening members extending longitudinally of said seat and back portions; whereby in the movements of the occupant on the seat, the attachment will move up and down in unison and relatively to the back of the seat.

4. An attachment for seats consisting of a flat body having incorporated therein a plurality of stiffening members extending longitudinally thereof and adapted to be flexed to form a seat portion to rest on the seat beneath the occupant, and a back portion to extend between the back of the occupant and back of the seat.

5. An attachment for seats, said attachment comprising a body or pad adapted to be appied to the seat and comprising a seat portion and a back portion, said back portion being movable relatively to the seat back in the cushioning actions of the seat, and said seat portion being provided with devices for attaching the same to the seat to cause it to move therewith.

6. An attachment for seats comprising a body or pad consisting of a plurality of stiffening members extending side by side, and flexible covering sheets applied to opposite sides of the stiffening members and secured together.

7. An attachment for seats, said attachment comprising a body or pad consisting of a plurality of stiffening members extending side by side, and a covering sheet of antifriction material applied to said stiffening members.

8. An attachment for seats, said attachment comprising a body or pad consisting of a plurality of stiffening members extending side by side, flexible covering sheets applied to opposite sides of said stiffening members, and additional covering sheets of antifriction material applied to the opposite sides of the first mentioned sheets.

9. An attachment for seats, said attachment comprising a body or pad having a seat portion to rest on the seat and a connected back portion to extend between the back of the occupant and back of the seat, and a guard or shield member applied to the rear side of the seat portion and adapted to contact with the surface of the seat back; whereby in the event that the guard adheres to the seat back, the up and down movements of the attachment relatively to the seat back will not be interfered with.

10. An attachment for seats, said attachment comprising a body or pad having a seat portion to rest on the seat and a connected back portion to extend between the back of the occupant and back of the seat, and a sheet of flexible material extending at the rear side of the back portion and connected at its upper and lower edges thereto, the said sheet extending loose between its points of connection; whereby in the event of the adherence of the sheet to the surface of the seat back, the attachment will be permitted to move freely up and down relatively to said back.

In testimony whereof, I have affixed my signature.

ALBAN H. REID.